US010437696B2

(12) United States Patent
Desikachari

(10) Patent No.: US 10,437,696 B2
(45) Date of Patent: *Oct. 8, 2019

(54) PROACTIVE INFORMATION TECHNOLOGY INFRASTRUCTURE MANAGEMENT

(71) Applicant: Appnomic Systems Private Limited, Bangalore (IN)

(72) Inventor: Padmanabhan Desikachari, Bangalore (IN)

(73) Assignee: Appnomic Systems Private Limited, Bangalore (IN)

(*) Notice: Subject to any disclaimer, the term of this patent is extended or adjusted under 35 U.S.C. 154(b) by 0 days.

This patent is subject to a terminal disclaimer.

(21) Appl. No.: 14/517,582

(22) Filed: Oct. 17, 2014

(65) Prior Publication Data

US 2015/0142414 A1    May 21, 2015

Related U.S. Application Data

(63) Continuation of application No. 12/360,856, filed on Jan. 28, 2009, now Pat. No. 8,903,757.

(30) Foreign Application Priority Data

Dec. 12, 2008 (IN) .............................. 3120CHE2008

(51) Int. Cl.
*G06F 11/34* (2006.01)
*G06F 17/00* (2019.01)
*H04L 12/24* (2006.01)

(52) U.S. Cl.
CPC ...... *G06F 11/3433* (2013.01); *G06F 11/3447* (2013.01); *G06F 17/00* (2013.01);
(Continued)

(58) Field of Classification Search
CPC ........ G06N 5/022; G06N 99/005; G06N 5/02; G06N 5/04; G06Q 10/10
(Continued)

(56) References Cited

U.S. PATENT DOCUMENTS 6,363,363 B1* 3/2002 Haller ..................... G06Q 20/00
 705/40
6,834,109 B1* 12/2004 Pare, Jr. .................... H04B 3/32
 375/254

(Continued)

OTHER PUBLICATIONS

Cohen et al, "AspectJ2EE = AOP + J2EE. Towards an Aspect Based, Programmable, and Extensible Middleware Framework", ECOOP 2004, LNCS 3086, pp. 221-245, 2004.*

(Continued)

*Primary Examiner* — Kakali Chaki
*Assistant Examiner* — Michael Zidanic
(74) *Attorney, Agent, or Firm* — Van Pelt, Yi & James LLP

(57) ABSTRACT

Disclosed herein is a computer implemented method and system for analyzing load responsive behavior of infrastructure components in an electronic environment for proactive management of the infrastructure components. Transaction data on multiple application transactions is collected. Load patterns are identified from the collected transaction data for generating load profiles. Data on infrastructure behavior in response to the application transactions is collected. Infrastructure behavior patterns are identified from the infrastructure behavior data for generating behavior profiles. The generated load profiles and the generated behavior profiles are correlated to create a load responsive behavior model. The created load responsive behavior model predicts behavior of the infrastructure components for different load patterns. A live data stream from current application transactions is analyzed using the load responsive behavior model
(Continued)

to determine current load responsive behavior. Deviations of the current load responsive behavior from the predicted behavior are detected using the load responsive behavior model.

54 Claims, 11 Drawing Sheets

(52) U.S. Cl.
CPC ........ *H04L 41/0896* (2013.01); *H04L 41/142* (2013.01); *H04L 41/147* (2013.01); *G06F 11/3409* (2013.01); *H04L 41/16* (2013.01)

(58) Field of Classification Search
USPC ......................................... 706/59, 61, 62, 45
See application file for complete search history.

(56) References Cited

U.S. PATENT DOCUMENTS

| | | | | |
|---|---|---|---|---|
| 6,836,800 | B1* | 12/2004 | Sweet | G06F 11/0709 709/224 |
| 7,716,150 | B2* | 5/2010 | Cheng | G06N 99/005 706/45 |
| 7,962,607 | B1* | 6/2011 | Chang | G06F 13/00 709/224 |
| 8,099,733 | B2* | 1/2012 | Birdwell | G06F 17/30327 718/100 |
| 2003/0225549 | A1* | 12/2003 | Shay | H04L 41/5009 702/182 |
| 2005/0033794 | A1* | 2/2005 | Aridor | H04L 29/06 709/200 |
| 2005/0075846 | A1* | 4/2005 | Kim | G01H 9/004 703/1 |
| 2006/0020924 | A1* | 1/2006 | Lo | G06F 11/0709 717/127 |
| 2006/0230134 | A1* | 10/2006 | Qian | H04L 67/36 709/224 |
| 2007/0265808 | A1* | 11/2007 | Kim | G01H 9/004 702/188 |
| 2008/0084116 | A1* | 4/2008 | Terricciano | H02J 13/0079 307/39 |
| 2008/0123549 | A1* | 5/2008 | Balakrishnan | H04L 41/142 370/253 |
| 2008/0221941 | A1* | 9/2008 | Cherkasova | G06F 9/505 718/106 |

OTHER PUBLICATIONS

Hernandez-Orallo et al, "Network Performance Analysis based on Histogram Workload Models (Extended Version)", Departamento de Informatica de sistemas y Computadores, Universidad Politecnica de Valencia. Camino de Vera, S/N. Valencia, Spain, Jan. 23, 2008.*
Jelacic et al, "End-to-End Real-Time IPTV Quality Monitoring", 50th International Symposium ELMAR-2008, Sep. 10-12, 2008, Zadar, Croatia.*
Lambert et al, "Adaptive Thresholds: Monitoring Streams of Network Counts", American Statistical Association, Journal of the American Statistical Association Mar. 2006, vol. 101, No. 473, Applications and Case Studies, DOI, 10.1198/016214505000000943.*
Zhang et al, "Scale Up Center-Based Data Clustering Algorithms by Parallelism", Software Technology Laboratory, HP Laboratories Palo Alto, HPL-2000-6, Jan. 2000.*

* cited by examiner

```
association = ULC[0] : LLC[0];
length = 1;
for (i = 1; i < n; i++)
    {
        if (ULC[i] == ULC[i-1] and LLC[i] == LLC[i-
        1])
            {
                length = length + 1;
            }
        else if (ULC[i] != ULC[i-1] or LLC[i] !=
        LLC[i-1])
            {
                print association, length;
                association = ULC[i] : LLC[i];
                length = 0
            }
    }
```

FIG. 5C

PROACTIVE INFORMATION TECHNOLOGY INFRASTRUCTURE MANAGEMENT

CROSS REFERENCE TO OTHER APPLICATIONS

This application is a continuation of U.S. patent application Ser. No. 12/360,856, now U.S. Pat. No. 8,903,757, entitled PROACTIVE INFORMATION TECHNOLOGY INFRASTRUCTURE MANAGEMENT filed Jan. 28, 2009 which is incorporated herein by reference for all purposes and which claims benefit of non-provisional India Patent Application No. 3120/CHE/2008 titled PROACTIVE INFORMATION TECHNOLOGY INFRASTRUCTURE MANAGEMENT filed on Dec. 12, 2008 which is incorporated herein by reference for all purposes.

BACKGROUND OF THE INVENTION

This invention, in general, relates to information technology infrastructure management. More particularly, this invention relates to proactive management of information technology infrastructure components based on an analysis of load responsive behavior of the infrastructure components in an electronic environment.

Electronic environments typically comprise many infrastructure components. The infrastructure components may be hardware components or software components. Different applications and application transactions generate different load conditions on the infrastructure components. The infrastructure components may behave differently under each of the load conditions. Managers and administrators in the electronic environment may not always know the behavior of the infrastructure components under different load conditions. Moreover, managers and administrators may not be able to manually detect load patterns and behavior patterns from historical load and behavior data. Furthermore, correlation between the load conditions and the behavior of the infrastructure components may be difficult, if done manually. At present, prediction of the behavior of the infrastructure components under given load conditions and prediction of load conditions for a given infrastructure behavior is difficult or problematic to ascertain.

Hence, there is a need for analyzing load responsive behavior of infrastructure components in an electronic environment for proactive management of the infrastructure components.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The computer implemented method and system disclosed herein address the above stated need for analyzing load responsive behavior of infrastructure components in an electronic environment for proactive management of the infrastructure components. Transaction data on multiple application transactions is collected in the electronic environment. Load patterns are identified from the collected transaction data for generating load profiles. The load patterns may be identified using normalization, clustering, and pattern sequencing techniques. Data on infrastructure behavior in response to the application transactions is collected. Infrastructure behavior patterns are identified from the collected infrastructure behavior data for generating behavior profiles. The generated load profiles and the generated behavior profiles are correlated to create a load responsive behavior model. The created load responsive behavior model predicts behavior of the infrastructure components for different load patterns. Distribution of the load profiles and the behavior profiles for a predefined period of time may be displayed.

Transaction data on multiple transactions of an application may be collected from each of multiple layers of deployment of the application for identifying load patterns to generate load profiles for each of the layers. Data on infrastructure behavior in response to application transactions from each of the layers may be collected for identifying the infrastructure behavior patterns to generate the behavior profiles for each of the layers. The generated load profiles of a first layer from the layers and the generated behavior profiles of a second layer from the layers adjacent to the first layer may be correlated to create the load responsive behavior model.

A live data stream from current application transactions is analyzed using the load responsive behavior model to determine a current load responsive behavior. Deviations of the current load responsive behavior from the predicted behavior are detected using the load responsive behavior model. Effects of modifications made to the infrastructure components may be predicted using the load responsive behavior model. The load responsive behavior model may be optimized using regression analysis. The detected deviations may be reported if the detected deviations exceed a dynamic threshold. The dynamic threshold may be determined from the collected transaction data.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

FIGS. 5A-5C exemplarily illustrate creation of the load responsive behavior model.

DETAILED DESCRIPTION

Figure 1:
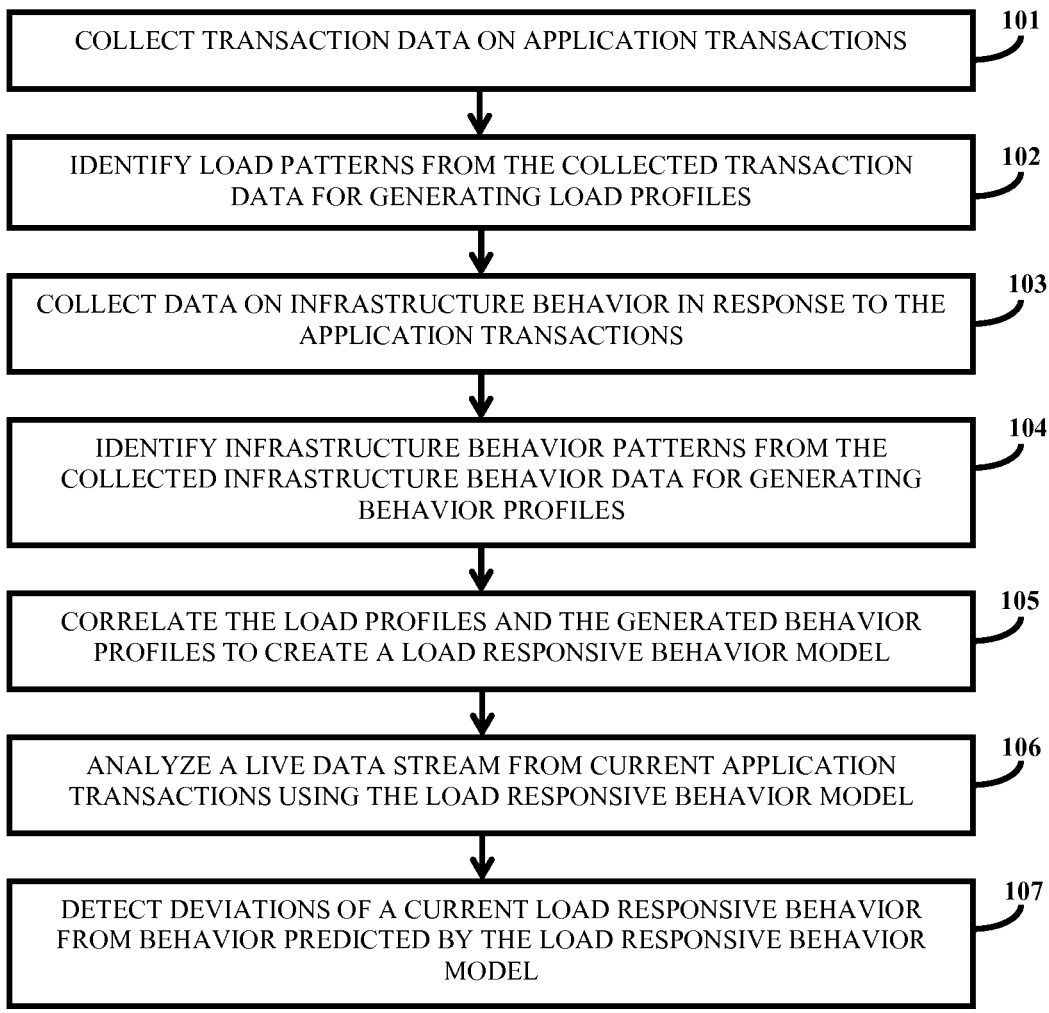
FIG. 1 illustrates a computer implemented method of analyzing load responsive behavior of infrastructure components in an electronic environment for proactive management of the infrastructure components.

FIG. 1 illustrates a computer implemented method of analyzing load responsive behavior of infrastructure components in an electronic environment for proactive management of the infrastructure components. Transaction data on multiple application transactions is collected 101 in the electronic environment. The transaction data may, for example, be historical transaction data or real time transaction data generated by a deployed application. The transaction data may be non-invasively collected using a sniffer based probe. The sniffer based probe may non-invasively collect the transaction data by tapping into data packets traveling between applications and users of the applications.

Granular transaction data on the application transactions may be collected using an application code embeddable instrumentation library. The application code embeddable instrumentation library may be included within a transaction code of an application to collect data on different parameters, for example, response time, associated with the transaction code. The data collected by the application code embeddable instrumentation library is herein referred to as the "granular transaction data". For example, for a balance inquiry transaction in a banking application, the granular transaction data may comprise response times for account lookup, balance amount calculation, etc.

Transaction data on multiple application transactions may be collected from each of multiple layers of deployment of the application. As used herein, the term "deployment" of an application refers to an aggregation of processes involved in making the application ready and available for use. The application may be deployed in different layers. As used herein, the term "layer" refers to each of multiple conceptually stacked modules of hardware, software, or a combination thereof. Key performance indicator (KPI) data may be collected from different layers of deployment of an application. KPI data from software layers and hardware layers in the application stack may also be collected from existing monitoring systems using an integration application programming interface (API). The integration API enables communication with the existing monitoring systems that may already be collecting the KPI data from the different layers of deployment of the application. An appropriate mode of communication may be determined for each of the existing monitoring systems. The KPI data may then be collected from the existing monitoring systems.

Load patterns are identified 102 from the collected transaction data for generating load profiles. As used herein, the term "load pattern" refers to a recurring scheme of load on an application determined by observation of the load on the application over a period of time. The term "load profile" refers to a representative description of the load on the application determined by, for example, mathematical, logical, or graphical manipulation of the load pattern. The term "load" refers to amount of work done by an infrastructure component in the electronic environment. The term "infrastructure components" refers to hardware components, software components, or hardware and software hybrid components that compose the electronic environment and do work. Load patterns may be identified for each of the layers of deployment of the application. Load profiles for each of the layers of deployment of the application are then generated.

The load patterns may be identified using normalization, clustering, and pattern sequencing techniques. The collected transaction data may be preprocessed before the step of identification of the load patterns. The collected transaction data are normalized by normalizing multiple parameters of the collected transaction data. The parameters may, for example, be KPI metrics, for example, transaction type, transaction volume for the application layer, open tables, slow queries, table locks, and connections for database layers. Each of the parameters is normalized by computing mean and standard deviation of the parameter, and computing a normalized score for each unit of the collected transaction data by dividing the numerical value of the transaction data by the computed standard deviation.

Each normalized unit of the collected transaction data is then plotted in a parameter space spanned by multiple parameters by representing the normalized unit of the collected data as a point in the parameter space. The plotted points in the parameter space are then clustered to create the load profiles. The plotted points may be clustered using different clustering strategies, for example, k-mean clustering, BIRCH, hierarchical clustering, model based clustering, spectral clustering, etc. The plotted points are clustered based on the similarity between the plotted points. The similarity may be determined using a distance measure.

Data on infrastructure behavior in response to the application transactions is collected 103 and monitored. The behavior of the infrastructure may be collected and monitored using different probes. For example, a software agent installed on a server in the electronic environment may collect data on operating system behavior, for example, central processing unit (CPU) utilization, memory utilization, and disk input and output operations per second. Software agents may also be installed on web servers in the electronic environment to collect data on, for example, total active sessions, sessions created, total requests, total bytes sent, total bytes received, etc. Infrastructure behavior data in response to application transactions from each of the layers may also be collected.

Infrastructure behavior patterns are identified 104 from the collected infrastructure behavior data for generating behavior profiles. As used herein, the term "behavior profile" refers to a representative description of the behavior of the infrastructure components in response to load exerted on the infrastructure components determined by, for example, mathematical, logical, or graphical manipulation of the behavior patterns. The infrastructure behavior patterns may be identified for each of the layers to generate behavior profiles for each of the layers. Distribution of the load profiles and the behavior profiles for a predefined period of time may be displayed. The distribution of the load profiles and the behavior profiles for a period of time, for example, from few minutes to a few hours may be displayed.

Figure 3:
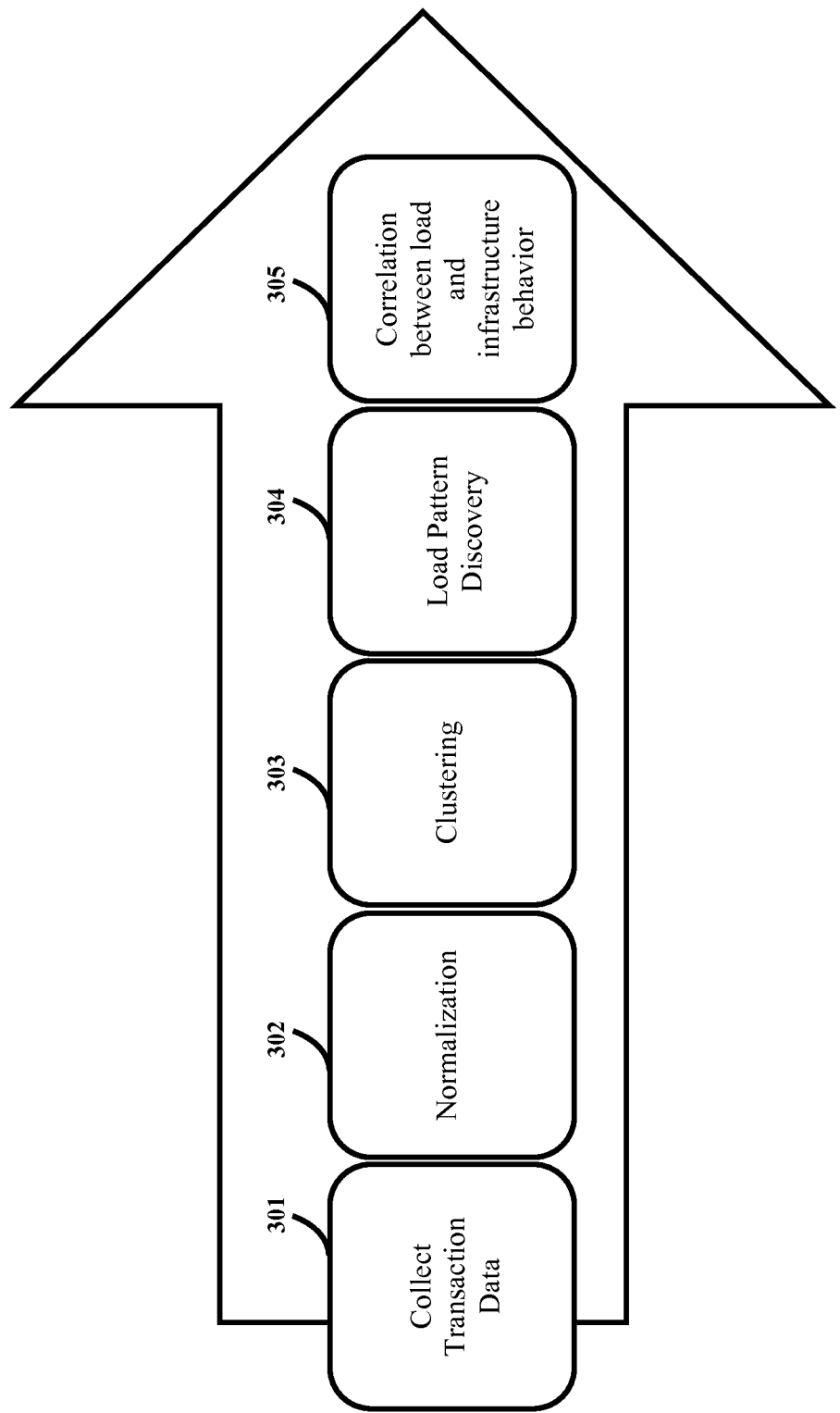
FIG. 3 exemplarily illustrates the process involved in creating the load responsive behavior model.

The generated load profiles and the generated behavior profiles are correlated 105 to create a load responsive behavior model. The load responsive behavior model is a predictive behavioral model that plots instantaneous units of load from the load profiles against corresponding behavior profiles of the infrastructure components for the instantaneous units of load. The created load responsive behavior model predicts behavior of the infrastructure components for different load patterns. The process involved in creating the load responsive behavior model is exemplarily illustrated in FIG. 3. As illustrated in FIG. 3, the transaction data is collected 301, and then taken through the steps of normalization 302, clustering 303, load pattern discovery 304, and correlation 305 with infrastructure behavior to create the load responsive behavior model. The load responsive behavior model may be used to predict an expected behavior of the infrastructure components under given load conditions. Conversely, the load responsive behavior model may also be used to compute optimal load conditions for a particular behavior of the infrastructure components.

The generated load profiles of a first layer from the layers and the generated behavior profiles of a second layer from the layers adjacent to the first layer may be correlated to create the load responsive behavior model. For example, the correlation may be performed across a pair of the layers comprising a lower layer and an upper layer to understand how the lower layer responds to load exerted by the upper layer.

Figure 5A:
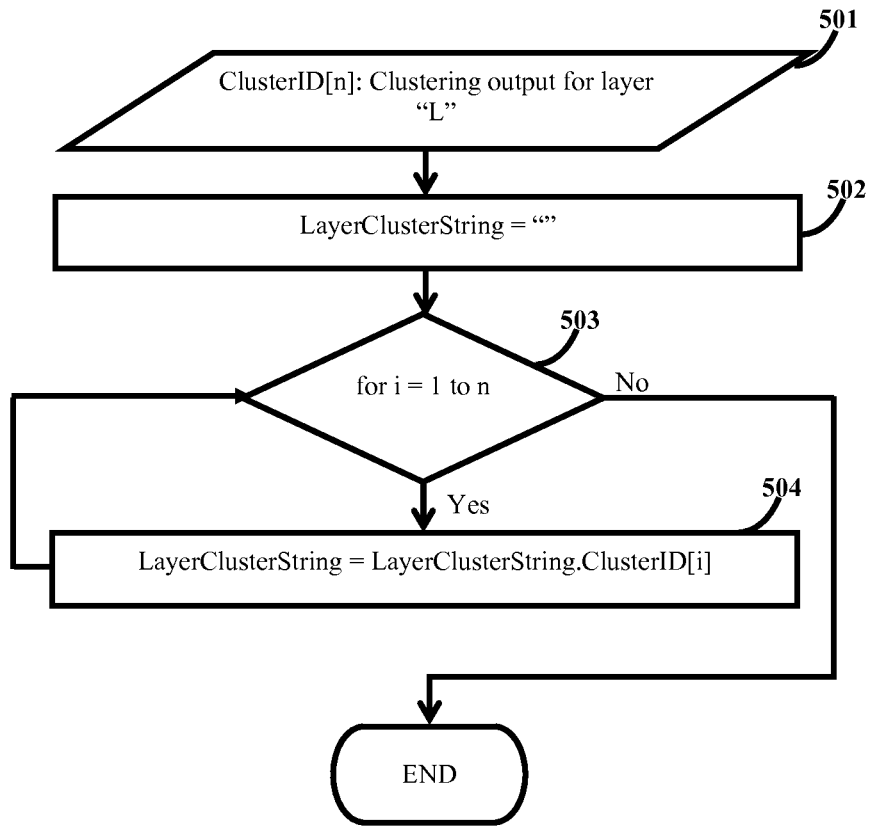
Figure 5B:
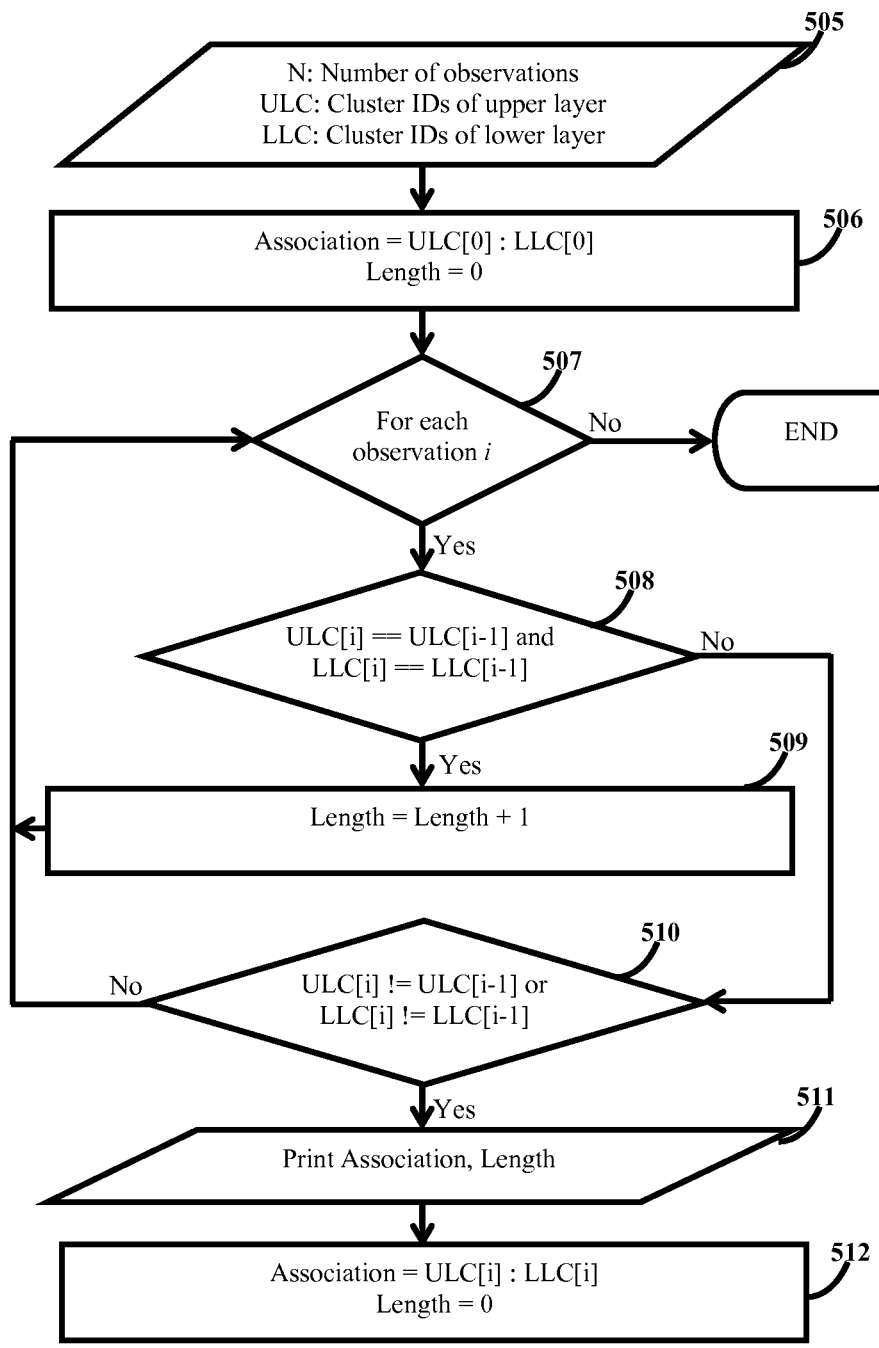

The creation of the load responsive behavior model is exemplarily illustrated in FIGS. 5A-5C. Historical load profiles are correlated with the generated behavior profiles. Each of the load profiles may be correlated for creating the load responsive behavior model. In FIG. 5A, clustering output for each layer "L" is assigned 501 to a "ClusterID[n]" variable array. The behavior of each infrastructure component is represented 502 as a string of profile identifiers. For each of the layers 503, the clustering is performed 504. After clustering 503 is completed for each of the layers, the process is terminated.

The load profiles are then correlated with the infrastructure component behavior using the Birch clustering algorithm and sequential association rules, as exemplarily illustrated in FIG. 5B. Variables N, ULC, and LLC are used to represent 505 the number of observations, cluster ids of upper layers, and cluster ids of lower layers respectively. ULC and LLC may be variable arrays. ULC and LLC are associated 506 with each other. A "Length" variable is initialized to 0. For each observation "i" 507, the cluster ids are checked 508. If each of the cluster ids of the upper layer and the lower layer is equal to a preceding cluster id, Length is incremented 509. If each of the cluster ids is not equal to a preceding cluster id, the cluster ids are further checked 510. If each of the cluster ids for the upper layer is not equal to a preceding cluster id or each of the cluster ids for the lower layer is not equal to a preceding cluster id, the output of the association between ULC and LLC and Length is printed 511. ULC and LLC are further associated 512 and Length is reset to 0. After the cluster ids are checked for each observation "i", the process is terminated. A pseudocode segment for performing the process illustrated in FIG. 5B is exemplarily illustrated in FIG. 5C.

A live data stream comprising real time transaction data from current application transactions is analyzed 106 using the load responsive behavior model to determine a current load responsive behavior. The live data stream may be part of one of the load profiles. The analysis may comprise identification of the load profile which is a part of the live data stream. Data on current behavior of the infrastructure components under the load of the live data stream is monitored and collected. The collected data on the behavior is then analyzed to identify a behavior profile that the collected behavior data is a part of. The current load responsive behavior is determined based on the analysis of the identified load profile and the identified behavior profile.

Although the load responsive behavior model enables prediction of the infrastructure behavior under any given load conditions, the current load responsive behavior may not necessarily conform to the predicted infrastructure behavior. The current load responsive behavior may deviate from the behavior predicted by the load responsive behavior model. The deviations of the current load responsive behavior from the predicted behavior are detected 107 using the load responsive behavior model. The current load responsive behavior may be compared with the predicted behavior to detect the deviations. Furthermore, variance of the current load responsive behavior may be computed and compared with variance of the predicted behavior. Variance of a variable is a statistical measure obtained by averaging a squared distance of possible values from a mean value of the variable. Herein, the variables are load units of the predicted behavior and the current load responsive behavior.

The detected deviations may be reported to an administrator in the electronic environment if the detected deviations exceed a dynamic threshold based on mean and standard deviation values within the load response behavior model. The dynamic threshold may be determined from the collected transaction data. Predictive alerts may be generated for reporting the detected deviations exceeding the dynamic threshold. The dynamic threshold may change based on input data, for example, the live data stream. Reporting of the deviations may, for example, enable the administrator of the electronic environment to diagnose erroneous or unexpected behavior of the infrastructure components under given load conditions.

The load responsive behavior model may be optimized using regression analysis. The optimization may be performed based on the comparison of the variance. Optimization of the load responsive behavior model ensures that the load responsive behavior model models the infrastructure behavior with maximal accuracy. Effects of modifications made to the infrastructure components may be predicted using on the load responsive behavior model. For example, if the random access memory (RAM) of a computing system is upgraded, the behavior of the computing system under different load conditions may be predicted. Conversely, the load responsive behavior model may be used to determine modifications to the infrastructure necessary to achieve a predefined infrastructure behavior under given load conditions.

The load responsive behavior model may be used for capacity planning A "what if" analysis may be performed for capacity planning. The "what if" analysis may comprise the steps of dependency analysis and regression modeling. Dependency analysis may be performed for understanding dependencies between different parameters. For example, in a transaction mix comprising different types of application transactions, the application transactions are independent of each other. The load on a central processing unit (CPU) processing the application transactions is dependent on the transaction mix. Objects and threads may be created during the processing of the application transactions. The created objects and threads generates load on a database storing the created objects and threads, wherein the generated load may be in terms of number of connections required to the database. Dependencies between pairs of parameters may be analyzed using regression analysis.

For each dependent parameter pair, a regression model is constructed. Regression models may not be built for independent parameters. The regression analysis may be performed using linear regression, logistic regression, and non linear regression. Linear regression is a form of regression analysis wherein a relationship between one or more independent variables and a dependent variable is modeled using a linear regression equation. The linear regression equation is a linear combination of one or more model parameters, also referred to as "regression coefficients".

Logistic regression is a model used for predicting the probability of occurrence of an event by fitting data into a logistic curve. Logistic regression makes use of different predictor variables that may be numerical or categorical. Non-linear regression is a form of regression analysis wherein observational data is modeled using a function which is a non linear combination of the model parameters and depends on one or more independent variables. The data may be fitted by a successive approximation method. Multiple regression models may be maintained for capacity planning using the "what if" analysis.

Figure 2:
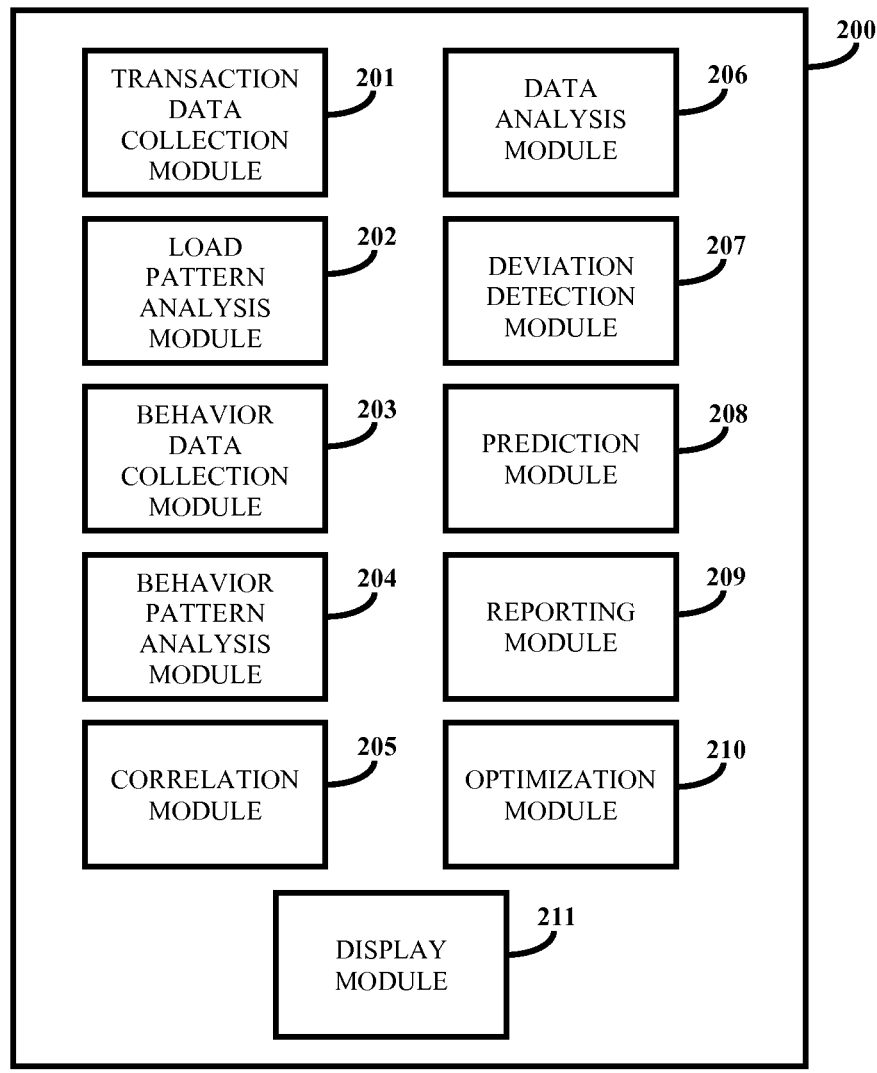
FIG. 2 illustrates a computer implemented system for analyzing load responsive behavior of infrastructure components in an electronic environment for proactive management of the infrastructure components.

FIG. 2 illustrates a computer implemented system 200 for analyzing load responsive behavior of infrastructure components in an electronic environment for proactive management of the infrastructure components. The system 200 disclosed herein comprises a transaction data collection module 201, a load pattern analysis module 202, a behavior data collection module 203, a behavior pattern analysis module 204, a correlation module 205, a data analysis module 206, a deviation detection module 207, a prediction module 208, a reporting module 209, an optimization module 210, and a display module 211.

The transaction data collection module 201 collects transaction data on multiple application transactions in the electronic environment. The load pattern analysis module 202 identifies load patterns from the collected transaction data for generating load profiles. The load pattern analysis module 202 may identify the load patterns using normalization, clustering, and pattern sequencing techniques. The behavior data collection module 203 collects data on infrastructure behavior in response to the application transactions. The behavior pattern analysis module 204 identifies behavior patterns from the collected infrastructure behavior data for generating behavior profiles.

The transaction data collection module 201 collects transaction data on multiple transactions of an application from each of multiple layers of deployment of an application. The load pattern analysis module 202 identifies load patterns for generating load profiles for each of the layers. The behavior data collection module 203 collects data on infrastructure behavior in response to transactions of an application from each of multiple layers of deployment of an application. The behavior pattern analysis module 204 identifies infrastructure behavior patterns for generating behavior profiles for each of the layers.

The correlation module 205 correlates the generated load profiles and the generated behavior profiles to create a load responsive behavior model. The created load responsive behavior model predicts behavior of the infrastructure components for different load patterns. The correlation module 205 correlates the generated load profiles of a first layer from multiple layers of deployment of an application and the generated behavior profiles of a second layer from the layers adjacent to the first layer to create the load responsive behavior model. The data analysis module 206 analyzes a live data stream from current application transactions using the load responsive behavior model to determine a current load responsive behavior from the predicted behavior using the load responsive behavior model.

The deviation detection module 207 detects deviations of the current load responsive behavior from the predicted behavior using the load responsive behavior model and generates predictive alerts. The reporting module 209 reports the detected deviations if the detected deviations exceed a dynamic threshold. The reporting module 209 determines the dynamic threshold from the collected transaction data. The reporting module 209 also provides reports on different trends in the load profiles and the behavior profiles. The prediction module 208 predicts effects of modifications made to the infrastructure components using the load responsive behavior model.

The prediction module 208 may be used for capacity planning. The optimization module 210 optimizes the load responsive behavior model. The optimization module 210 may optimize the load responsive behavior model using regression analysis. The display module 211 displays distribution of the load profiles and the behavior profiles for a predefined period of time.

Figure 4A:
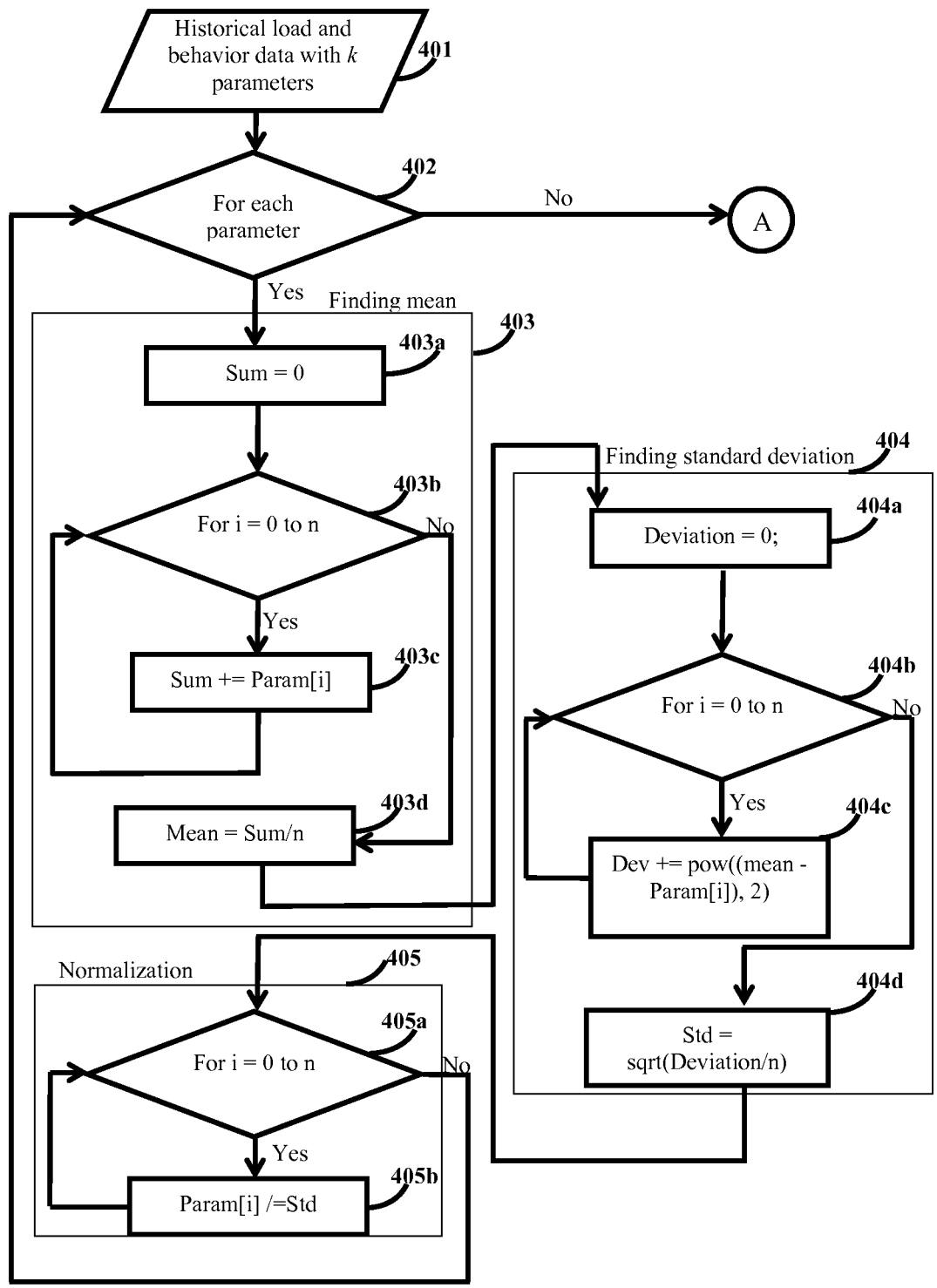
FIGS. 4A-4B exemplarily illustrate the process involved in generating load profiles and behavior profiles.
Figure 4B:
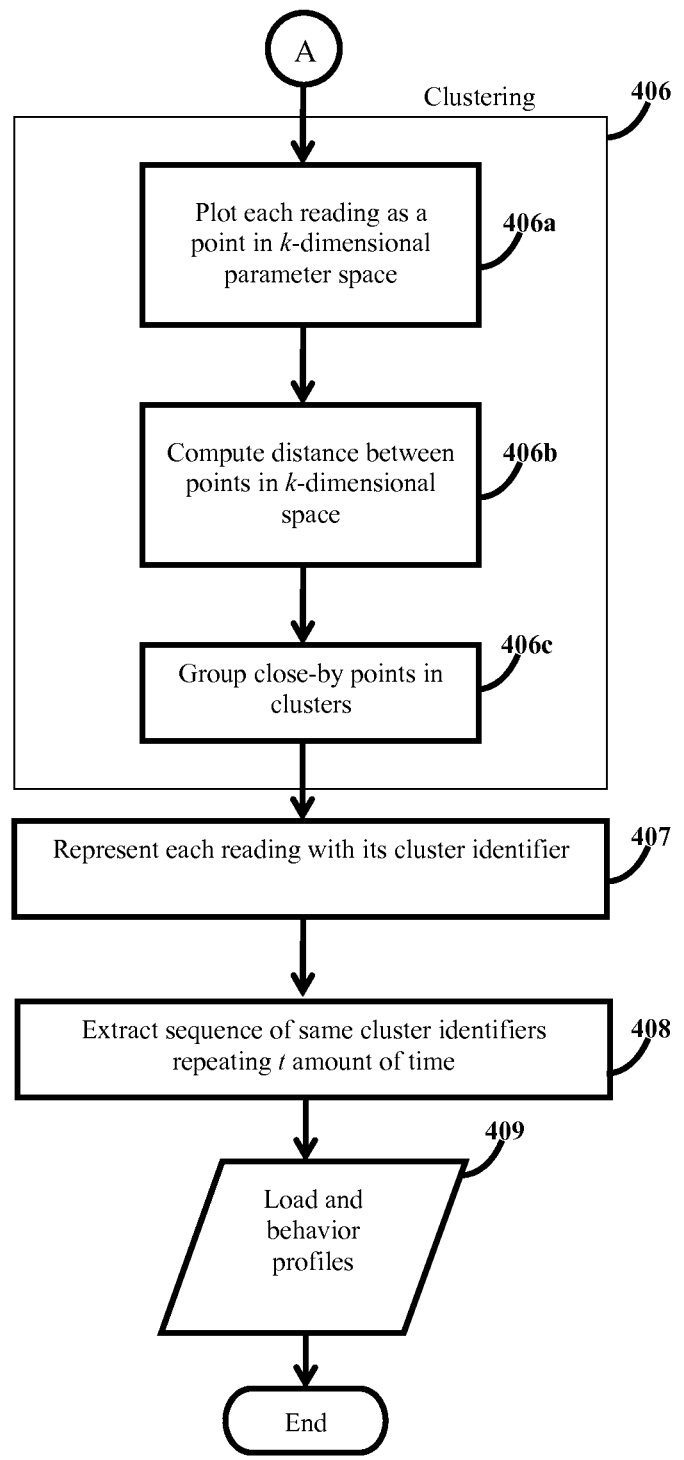

FIGS. 4A-4B exemplarily illustrate the process involved in generating the load profiles and the behavior profiles. The historical load data and behavior data is represented 401 by "k" number of parameters. For each of the parameters 402, the mean of each of the parameters is found 403. For finding the mean, a variable "Sum" is set 403a to 0. For each of the parameters 403b, Sum is updated 403c using an equation "Sum+=Param[i]" for values of i between 0 and n, where n is the total number of parameters. The mean is computed 403d by dividing Sum by n. Standard deviation is found 404 for the parameters. A variable Deviation is initialized 404a to 0. For each of the parameters 404b, Deviation is updated 404c using an equation "Deviation+=pow((mean−Param[i]), 2)". The standard deviation is computed 404d by dividing Deviation by number of parameters n and computing the square root of the result. The data is normalized 405. Each of the parameters from 0 to n 405a is divided 405b by the standard deviation. The historical data may be normalized using a "z-score" normalization technique.

Each of the computed values of the each of the parameters is then converted into a z-score or a normalized value based on a predefined formula. The historical data is converted into normalized data. The normalized data is clustered 406. Clustering performed by classifying the normalized data into different groups, thereby partitioning of normalized data into subsets wherein data in each of the subsets share one or more common properties. The subsets may be referred to as clusters. Each reading of the normalized data is plotted 406a as a point in the k-dimensional parameter space. The distance between the points in k-dimensional space is computed 406b. Close-by points are grouped 406c in clusters. Birch clustering algorithm may be used to identify the load patterns from the normalized historical data. Each of the clusters may be assigned a cluster identifier (id). Once the load profiles and the behavior profiles are identified using clustering, the readings of the normalized historical data are represented 407 with the respective cluster identifiers (ids), thereby forming a string of clusters. Continuous occurrences of cluster ids are extracted 408 to generate 409 the load profiles and the behavior profiles.

Figure 6:
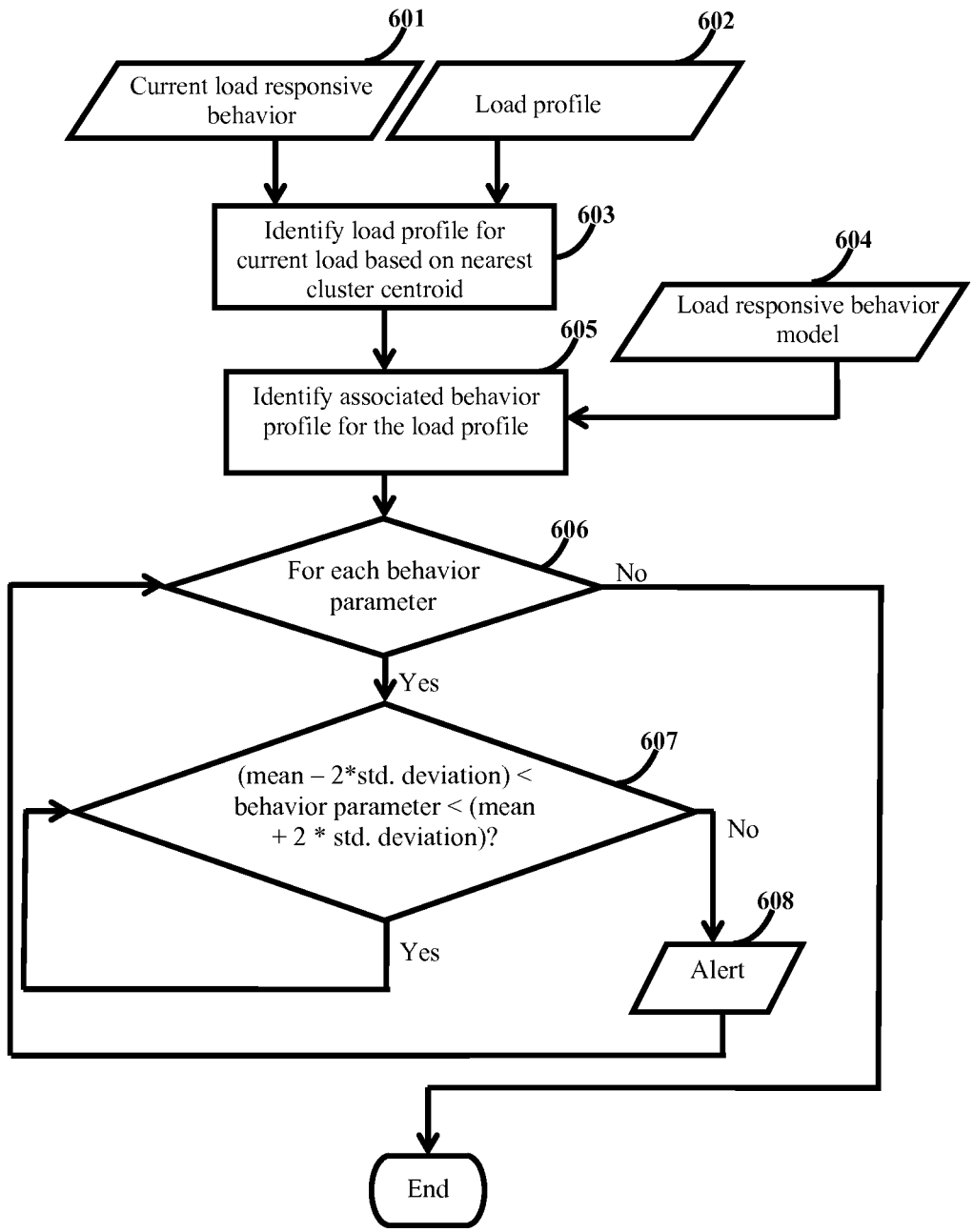
FIG. 6 exemplarily illustrates predictive alerting using the load responsive behavior model.

FIG. 6 exemplarily illustrates predictive alerting using the load responsive behavior model. The current load responsive behavior is determined 601. The load profiles are obtained 602. A centroid of the cluster closest to current load conditions is identified. Load profile for the current load responsive behavior is identified 603 based on the nearest centroid. The load responsive behavior model is obtained 604. The behavior profile associated with the current load profile is identified 605 using the load responsive behavior model. For each behavior parameter 606, value of each of the behavior parameters is checked 607 for a condition "(mean−2*std. deviation)<behavior parameter<(mean+ 2*std. deviation)". If the result is true for one behavior parameter, a next behavior parameter is checked. If the result is false, the predictive alert is generated 608. After each behavior parameter is checked 606, the process is terminated. Mean and standard deviation may be computed for each behavior parameter for generating the predictive alerts.

Figure 7:
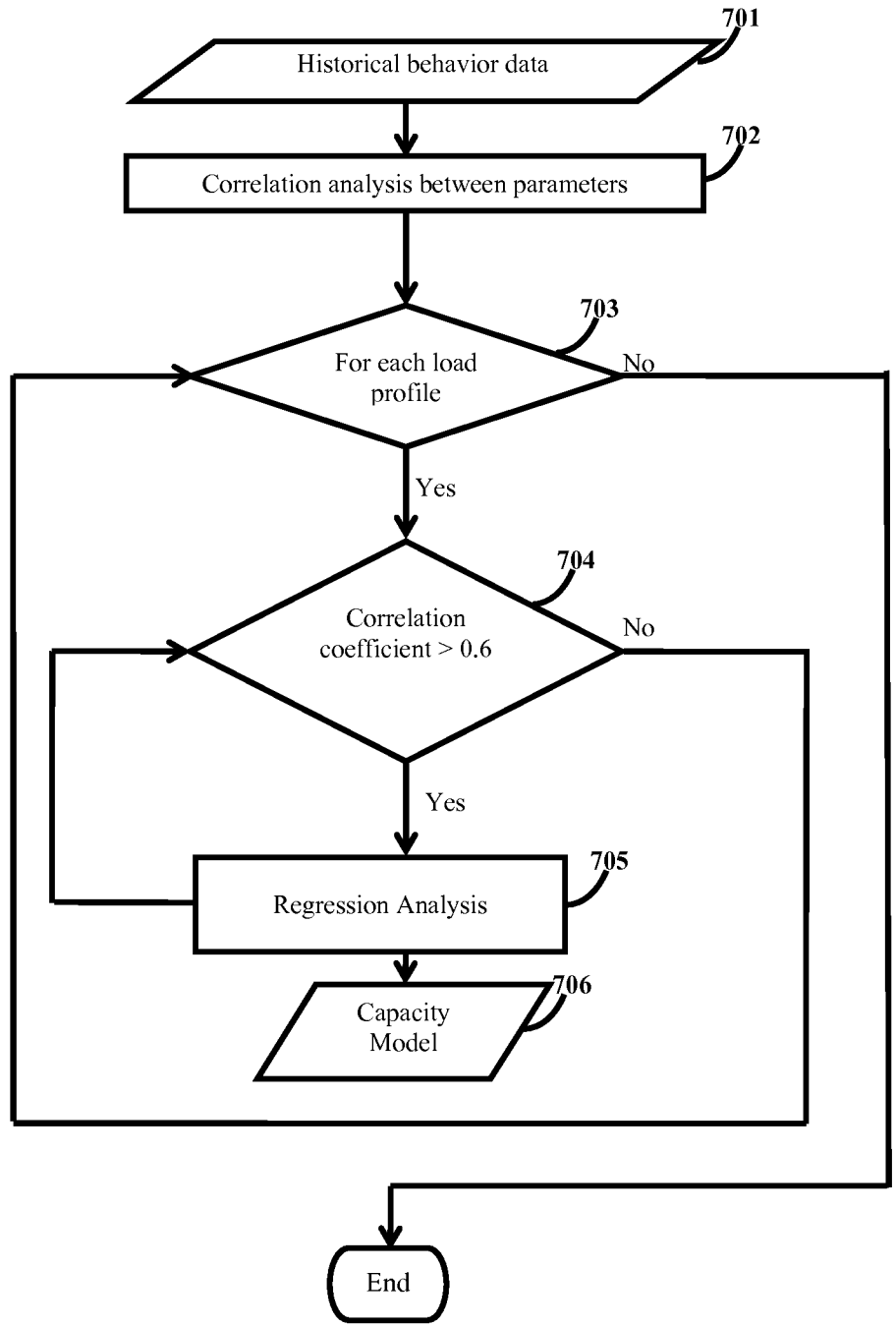
FIG. 7 exemplarily illustrates the process involved in capacity planning using the load responsive behavior model.

FIG. 7 exemplarily illustrates the process involved in capacity planning using the load responsive behavior model. Historical behavior data is collected 701. Correlation analysis is performed 702 between behavior parameters based on the collected historical data. For each of the load profiles 703, the correlation coefficient is checked 704. If the checked correlation coefficient is greater than a predefined value, for example, 0.6, regression analysis 705 is performed. If the correlation coefficient for a load profile is lower than the predefined value, the next load profile is checked for the need to perform the regression analysis. A capacity model is obtained 706 by performing the regression analysis. The capacity model is used for the capacity planning After the correlation coefficient for each of the load profiles is checked 703, the process is terminated.

Figure 8:
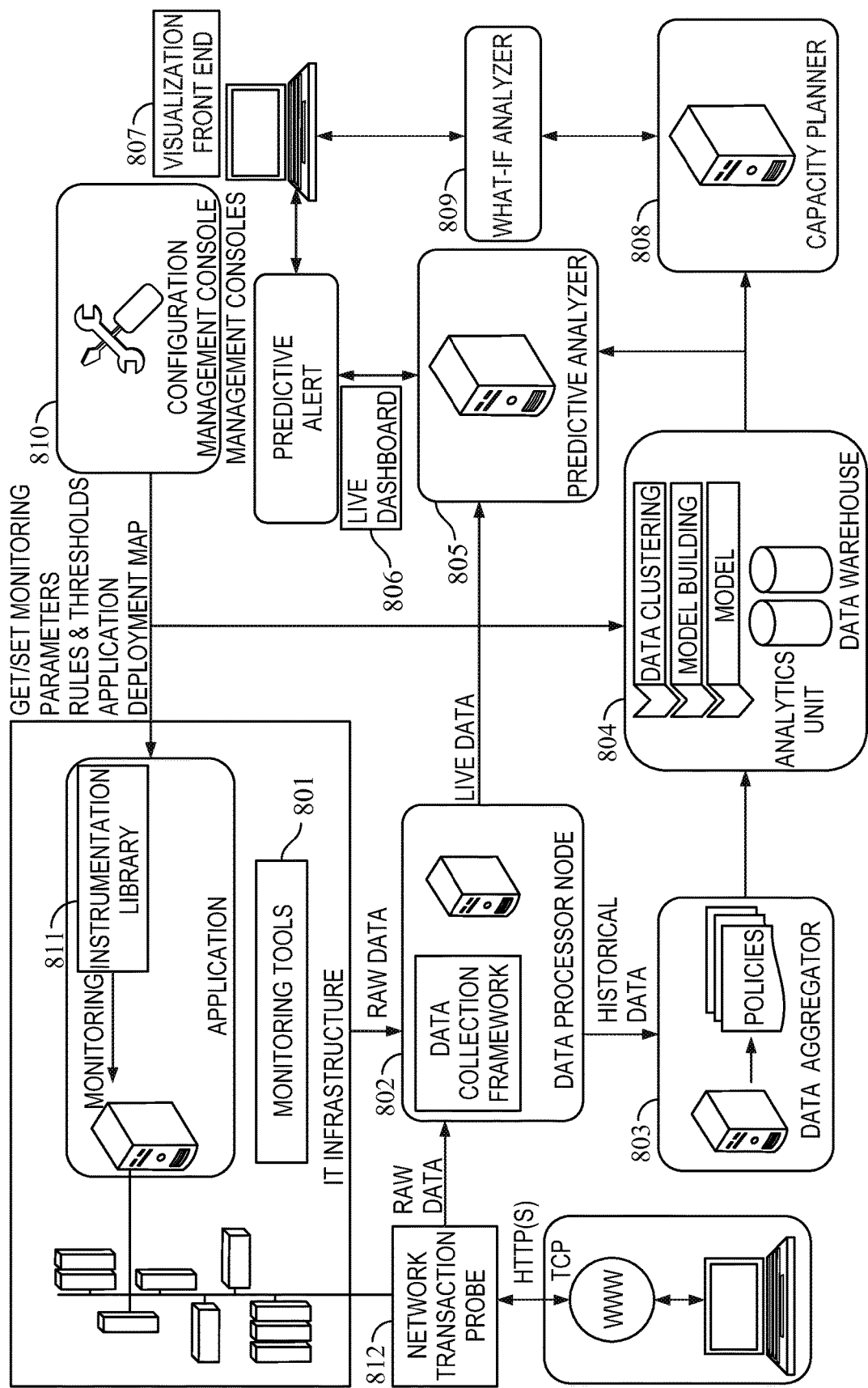
FIG. 8 exemplarily illustrates components of the computer implemented system for analyzing load responsive behavior of infrastructure components in an electronic environment for proactive management of the infrastructure components.

FIG. 8 exemplarily illustrates components of the computer implemented system 200 for analyzing load responsive behavior of infrastructure components in an electronic environment for proactive management of the infrastructure components. The system 200 further comprises monitoring tools 801, a data processor node 802, a data aggregator 803, an analytics unit 804, a predictive analyzer 805, a live dashboard 806, a visualization front end 807, a capacity planner 808, a what-if analyzer 809, a configuration management console 810, an instrumentation library 811, and a network transaction probe 812.

The monitoring tool 801 monitors and collects infrastructure behavior data. The configuration management console 810 further collects the infrastructure behavior data. The instrumentation library 811 and the network transaction probe 812 collect transaction data on the application transactions. The data processor node 802 processes the collected transaction data for analysis. The data aggregator 803 aggregates the processed data for determining the load patterns and the behavior patterns. The analytics unit 804 analyzes and correlates the aggregated data for creating the load responsive behavior model. The predictive analyzer 805 analyzes the current load responsive behavior using the load responsive behavior model to detect deviations. The live dashboard 806 enables configuration of the components. The visualization front end 807 provides a visual interface for the configuration of the components. The capacity planner 808 performs capacity planning using the load responsive behavior model. The what-if analyzer 809 predicts effects of modifications made to the components based on the load responsive behavior model.

Consider an example of a monitoring tool for an online banking portal. An application load layer of the online banking portal is monitored using the transaction data collection module 201 to capture data on volume and type of transactions being executed. Simultaneously, the response time for each of the transactions is also captured. The behavior data collection module 203 captures, for example, the 10 most popular queries executing in a database layer of the online banking portal along with the response time, query parameters, central processing unit (CPU) usage, and disk input and output (I/O) operations for each of the queries.

The load pattern analysis module 202 identifies patterns in the load, for example, "end of month statement lookup", wherein users of the online banking portal log in at the end of each month to check bank statements on receiving a notification. The behavior pattern analysis module 204 also identifies patterns in the 10 most popular queries executing in the database layer. The correlation module 205 determines an expected database behavior pattern for the identified "end of month statement lookup" load and builds an "end of month statement lookup" load responsive behavior model.

In subsequent months, the "end of month statement lookup" load responsive behavior model is compared in real time with actual database behavior. The actual database behavior may be identified by capturing the 10 most popular queries with the response time, query parameters, CPU usage, and disk I/O operations in real time for each of the queries. Deviations, for example, spikes in disk I/O operations, are detected. A database administrator is alerted of the deviation and possible causes for the deviation. For example, a cause for the deviation may be faulty disk I/O operations for a one among the 10 most popular queries.

The database administrator may further analyze actual and average disk I/O values, and an execution pattern of the query causing the deviations. The database administrator may come to a conclusion on the reason for the deviations and corrective actions to be taken. The deviations in the behavior may be predicted in advance of any impact being felt by a user of the online banking portal. The database administrator is warned in advance about the deviations before they actually occur. By taking corrective action, the database administrator may avert a situation where the users of the online banking portal trying to access the monthly statements experience slow response times to queries.

It will be readily apparent that the various methods and algorithms described herein may be implemented in a computer readable medium appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hard-wired circuitry or custom hardware may be used in place of, or in combination with, software instructions for implementation of the processes of various embodiments. Thus, embodiments are not limited to any specific combination of hardware and software. A "processor" means any one or more microprocessors, Central Processing Unit (CPU) devices, computing devices, microcontrollers, digital signal processors or like devices. The term "computer-readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include Dynamic Random Access Memory (DRAM), which typically constitutes the main memory. Transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product comprising computer executable instructions embodied in a computer-readable medium comprises computer parsable codes for the implementation of the processes of various embodiments.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, Sun® processors, IBM® processors etc., that are adapted to communicate with the computer. Any number and type of machines may be in communication with the computer.

The foregoing examples have been provided merely for the purpose of explanation and are in no way to be construed as limiting of the present invention. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A system, comprising:
   a processor, configured to:
   collect transaction data on a plurality of transactions comprising an application from each of a plurality of layers of deployment of the application, wherein each layer of the application comprises applicable hardware and software infrastructure components;
   identify load patterns from the collected transaction data for generating load profiles for each of the plurality of layers of deployment of the application;
   collect data on infrastructure behavior in response to the application transactions from each of the application layers, wherein data on infrastructure behavior comprises performance indicators of hardware and software infrastructure components comprising each application layer;
   identify behavior patterns from the collected infrastructure behavior data for generating behavior profiles for each of the plurality of layers of deployment of the application;
   correlate load profiles generated for the plurality of layers of deployment of the application with behavior profiles generated for adjacent layers comprising the plurality of layers of deployment of the application to create a load responsive behavior model that models behavior of the hardware and software infrastructure components for different loads on the application; and
   determine effects of modifications made to the hardware and software infrastructure components on infrastructure behavior under given load conditions using the load responsive behavior model; and
   a memory coupled to the processor and configured to provide instructions to the processor.

2. The system of claim 1, wherein the processor is further configured to optimize the load responsive behavior model.

3. The system of claim 2, wherein the load responsive behavior model is optimized using regression analysis.

4. The system of claim 1, wherein the processor is further configured to predict an expected behavior of the hardware and software infrastructure components under given load conditions using the load responsive behavior model.

5. The system of claim 1, wherein the processor is further configured to determine a load condition for a particular behavior of the hardware and software infrastructure components using the load responsive behavior model.

6. The system of claim 1, wherein the processor is further configured to plan capacity of the hardware and software infrastructure components.

7. The system of claim 1, wherein the processor is further configured to compare a current load responsive behavior with a predicted behavior predicted by the load responsive behavior model.

8. The system of claim 1, wherein the processor is further configured to detect deviations of a current load responsive behavior from a predicted behavior predicted by the load responsive behavior model.

9. The system of claim 8, wherein the processor is further configured to report detected deviations that exceed a threshold.

10. The system of claim 1, wherein the processor is further configured to report trends in load profiles and behavior profiles.

11. The system of claim 1, wherein the processor is further configured to display a distribution of load profiles and behavior profiles.

12. The system of claim 1, wherein to collect transaction data on a plurality of transactions comprises to normalize the collected transaction data.

13. The system of claim 1, wherein to identify load patterns comprises clustering the collected transaction data.

14. The system of claim 1, wherein the collected transaction data comprises either or both of historical transaction data and real time transaction data.

15. The system of claim 1, wherein the collected transaction data comprises response times.

16. The system of claim 1, wherein the collected transaction data comprises KPI (key performance indicator) metrics.

17. The system of claim 1, wherein the collected infrastructure behavior data comprises data on operating system behavior.

18. The system of claim 1, wherein the collected infrastructure behavior data comprises data associated with sessions.

19. A method, comprising:
collecting transaction data on a plurality of transactions comprising an application from each of a plurality of layers of deployment of the application, wherein each layer of the application comprises applicable hardware and software infrastructure components;
identifying load patterns from the collected transaction data for generating load profiles for each of the plurality of layers of deployment of the application;
collecting data on infrastructure behavior in response to the application transactions from each of the application layers, wherein data on infrastructure behavior comprises performance indicators of hardware and software infrastructure components comprising each application layer;
identifying behavior patterns from the collected infrastructure behavior data for generating behavior profiles for each of the plurality of layers of deployment of the application;
correlating load profiles generated for the plurality of layers of deployment of the application with behavior profiles generated for adjacent layers comprising the plurality of layers of deployment of the application to create a load responsive behavior model that models behavior of the hardware and software infrastructure components for different loads on the application; and
determining effects of modifications made to the hardware and software infrastructure components on infrastructure behavior under given load conditions using the load responsive behavior model.

20. A computer program product embodied in a non-transitory computer readable storage medium and comprising computer instructions for:
collecting transaction data on a plurality of transactions comprising an application from each of a plurality of layers of deployment of the application, wherein each layer of the application comprises applicable hardware and software infrastructure components;
identifying load patterns from the collected transaction data for generating load profiles for each of the plurality of layers of deployment of the application;
collecting data on infrastructure behavior in response to the application transactions from each of the application layers, wherein data on infrastructure behavior comprises performance indicators of hardware and software infrastructure components comprising each application layer;
identifying behavior patterns from the collected infrastructure behavior data for generating behavior profiles for each of the plurality of layers of deployment of the application;
correlating load profiles generated for the plurality of layers of deployment of the application with behavior profiles generated for adjacent layers comprising the plurality of layers of deployment of the application to create a load responsive behavior model that models behavior of the hardware and software infrastructure components for different loads on the application; and
determining effects of modifications made to the hardware and software infrastructure components on infrastructure behavior under given load conditions using the load responsive behavior model.

21. The method of claim 19, further comprising optimizing the load responsive behavior model.

22. The method of claim 21, wherein the load responsive behavior model is optimized using regression analysis.

23. The method of claim 19, further comprising predicting an expected behavior of the hardware and software infrastructure components under given load conditions using the load responsive behavior model.

24. The method of claim 19, further comprising determining a load condition for a particular behavior of the hardware and software infrastructure components using the load responsive behavior model.

25. The method of claim 19, further comprising planning capacity of the hardware and software infrastructure components.

26. The method of claim 19, further comprising comparing a current load responsive behavior with a predicted behavior predicted by the load responsive behavior model.

27. The method of claim 19, further comprising detecting deviations of a current load responsive behavior from a predicted behavior predicted by the load responsive behavior model.

28. The method of claim 27, further comprising reporting detected deviations that exceed a threshold.

29. The method of claim 19, further comprising reporting trends in load profiles and behavior profiles.

30. The method of claim 19, further comprising displaying a distribution of load profiles and behavior profiles.

31. The method of claim 19, wherein collecting transaction data on a plurality of transactions comprises normalizing the collected transaction data.

32. The method of claim 19, wherein identifying load patterns comprises clustering the collected transaction data.

33. The method of claim 19, wherein the collected transaction data comprises either or both of historical transaction data and real time transaction data.

34. The method of claim 19, wherein the collected transaction data comprises response times.

35. The method of claim 19, wherein the collected transaction data comprises KPI (key performance indicator) metrics.

36. The method of claim 19, wherein the collected infrastructure behavior data comprises data on operating system behavior.

37. The method of claim 19, wherein the collected infrastructure behavior data comprises data associated with sessions.

38. The computer program product of claim 20, further comprising computer instructions for optimizing the load responsive behavior model.

39. The computer program product of claim 38, wherein the load responsive behavior model is optimized using regression analysis.

40. The computer program product of claim 20, further comprising computer instructions for predicting an expected behavior of the hardware and software infrastructure components under given load conditions using the load responsive behavior model.

41. The computer program product of claim 20, further comprising computer instructions for determining a load condition for a particular behavior of the hardware and software infrastructure components using the load responsive behavior model.

42. The computer program product of claim 20, further comprising computer instructions for planning capacity of the hardware and software infrastructure components.

43. The computer program product of claim 20, further comprising computer instructions for comparing a current load responsive behavior with a predicted behavior predicted by the load responsive behavior model.

44. The computer program product of claim 20, further comprising computer instructions for detecting deviations of a current load responsive behavior from a predicted behavior predicted by the load responsive behavior model.

45. The computer program product of claim 44, further comprising computer instructions for reporting detected deviations that exceed a threshold.

46. The computer program product of claim 20, further comprising computer instructions for reporting trends in load profiles and behavior profiles.

47. The computer program product of claim 20, further comprising computer instructions for displaying a distribution of load profiles and behavior profiles.

48. The computer program product of claim 20, wherein collecting transaction data on a plurality of transactions comprises normalizing the collected transaction data.

49. The computer program product of claim 20, wherein identifying load patterns comprises clustering the collected transaction data.

50. The computer program product of claim 20, wherein the collected transaction data comprises either or both of historical transaction data and real time transaction data.

51. The computer program product of claim 20, wherein the collected transaction data comprises response times.

52. The computer program product of claim 20, wherein the collected transaction data comprises KPI (key performance indicator) metrics.

53. The computer program product of claim 20, wherein the collected infrastructure behavior data comprises data on operating system behavior.

54. The computer program product of claim 20, wherein the collected infrastructure behavior data comprises data associated with sessions.

\* \* \* \* \*